United States Patent [19]

Brodesser

[11] 4,397,542
[45] Aug. 9, 1983

[54] XEROGRAPHIC ENVELOPE PRINTING

[75] Inventor: Gerd R. Brodesser, Penfield, N.Y.

[73] Assignee: Xerox Corporation, Stamford, Conn.

[21] Appl. No.: 354,557

[22] Filed: Mar. 3, 1982

[51] Int. Cl.³ .............................................. G03G 15/00
[52] U.S. Cl. ........................ 355/14 R; 101/DIG. 13; 101/426; 355/3 R; 355/77
[58] Field of Search ................... 355/14 R, 14 C, 3 R, 355/77, 6, 16; 101/DIG. 13, 426

[56] References Cited

U.S. PATENT DOCUMENTS

| | | | |
|---|---|---|---|
| 3,373,989 | 3/1968 | Le Baron | 271/2 |
| 3,596,093 | 7/1971 | Boatman et al. | 250/65 |
| 3,726,520 | 4/1973 | Doi | 271/18 |
| 3,930,725 | 1/1976 | Jones et al. | 355/14 |
| 3,967,818 | 7/1976 | Gundlach | 270/18 |
| 3,979,112 | 9/1976 | Munn et al. | 270/58 |
| 4,043,859 | 8/1977 | Van Dam | 156/566 |
| 4,049,256 | 9/1977 | Church et al. | 271/9 |
| 4,065,117 | 12/1977 | Thorsheim | 270/58 |
| 4,167,476 | 9/1979 | Jackson | 209/3.3 |
| 4,211,483 | 7/1980 | Hannigan et al. | 355/14 |
| 4,294,534 | 10/1981 | Snelling | 355/77 X |
| 4,330,195 | 5/1982 | Lavallee | 355/77 X |

Primary Examiner—R. L. Moses

[57] ABSTRACT

A marking system for printing envelopes. The disclosed system includes a xerographic marking engine with conventional photoconductive photoreceptor. The photoreceptor is encoded with information by a controller, a laser raster output scanner (ROS) and a development subsystem. Envelopes to be printed are moved into transfer relationship with the photoreceptor so that a toner powder image is transferred to the envelope and then moved to a fusing and output station. The controller is apprised of the fact that it is to operate in an envelope printing mode by a sensor mounted to the main paper input tray which senses the presence of a special envelope cassette where the cassette is inserted into the paper tray.

9 Claims, 8 Drawing Figures

XEROGRAPHIC ENVELOPE PRINTING

BACKGROUND OF THE INVENTION

1. Field of the Invention

The present invention relates to envelope addressing and more particularly to method and apparatus for marking envelopes with a xerographic marking engine.

2. Background

Automated envelope addressing methods are known. The incentive to improve those methods varies in proportion to the number of envelopes to be addressed. The small volume entrepreneur can most economically accomplish mailings with a typewriter and an efficient secretary. When thousands of letters are to be mailed, however, time and cost constraints dictate the use of automatic envelope addressing techniques.

One prior art addressing technique is to first print a series or sequence of mailing addresses onto separate labels which then can be affixed to the packages or envelopes to be mailed. U.S. Pat. No. 3,647,602 entitled "Selective Article Labeling Control Form" to McGuire, for example, discloses a labeling machine which automatically applies labels to multiple articles. The printed labels in the form of label strips used by the '602 apparatus are generated separately by a label printing device which might comprise, for example, the apparatus disclosed in U.S. Pat. No. 3,661,453 to McGuire et al. This second reference patent relates to a label printing apparatus wherein a label printer electrostatically prints a continuous strip of labels from individual master address cards. A finished label strip might then typically be utilized by the apparatus disclosed in the '602 patent to complete the addressing process. When electrostatic label printers such as that described in the '453 patent are utilized, the address information must first be printed or typed in a xerographically recognizable form so that it may be copied onto the labels. As disclosed in the '453 patent, this is normally accomplished by typing on white or light colored cards the address information and then xerographically copying those cards according to known xerographic techniques.

The above described process is certainly much quicker than individual typing of all address information onto the articles to be mailed, yet may not be the most efficient mailing technique depending on the particular application. The xerographic copying of address information onto individual labels requires that each time a different address is to be affixed to a label a different xerographically recognizable original must be typed or printed for use by the system. Additionally, any label printing system requires that an additional step, i.e. the affixing of the label to the document or package must take place prior to mailing.

When the item to be mailed is a large package or irregularly shaped object, the use of the above described system may be the most efficient way for addressing that article. For a regular shaped object such as an envelope, however, it would be advantageous to avoid the above described limitations encountered with a label printing system.

The IBM commercial ink jet printer has an envelope printing capability. This printer includes an envelope holder and envelope feeder which drives blank envelopes to an ink jet print station when the envelopes are printed directly without any intermediate label printing. This printer has no graphics capability, however, and involves a separate subsystem for handling envelopes. The IBM ink jet envelope printing technique does benefit from electronic storage of address data which represents an advance over the imaging of a master each time an envelope is printed.

SUMMARY OF THE INVENTION

The present invention avoids the necessity for affixing label addresses onto individual items to be mailed and increases the flexibility in address information by avoiding the necessity for individual typing of address masters. An automated method and apparatus for printing envelopes with address information is disclosed. The technique will not work for large packages and/or irregularly shaped objects and for this reason, use of the prior art addressing methods for those items is preferred.

According to the invention, a xerographic marking engine is used for marking address information onto standard size envelopes. The xerographic marking engine includes a mechanism for holding the unmarked envelopes prior to printing. It further includes a sensor for distinguishing between the presence of envelopes and other material to be printed by the marking engine. When envelopes are sensed, the marking engine enters a so called envelope printing mode of operation. In this mode, the marking engine drives the envelopes from the holding station to a transfer station wherein a powder image of the xerographically generated address is transferred to the moving envelope. Subsequent to the transfer step, the address information is fused to the envelope and stacked at an output station of the xerographic engine.

Although in theory, the address information could be derived from a master input type in a manner analagous to the technique disclosed in the above-mentioned '453 patent, a preferred method for generating the address information is to utilize electronically stored addresses to control operation of an automatic encoder which might, for example, comprise a laser printer.

Practice of the invention avoids the necessity for transferring typed, printed, or xerographically generated labels onto the envelopes. Use of electronically stored addressed information in combination with the laser printer also adds great flexibility to the system since masters or originals need no longer be printed and/or typed. By using an electronically stored master in conjunction with a high resolution graphics laser printer, other information such as a mailing permit can be affixed to the envelope at the same time the address information is applied.

The present invention anticipates the modification of a conventional xerographic marking engine for use in envelope printing. In particular, the mechanism for holding the unmarked envelopes preferably comprises a suitably designed cassette holder which precisely positions unmarked envelopes in a normal copier tray. Thus, no separate subsystem for envelope printing is required. When envelopes are to be printed, the operating characteristics of the copier must, however, be adjusted to take into account the added thickness of the envelopes due to their multiply construction. Thus, the fusing and transfer characteristics of the xerographic process must be modified when envelopes are to be marked directly rather than first applying information to labels that could later be affixed to the envelopes.

From the above, it should be appreciated that one object of the invention is the direct application of address and/or other information to conventional size envelopes without the necessity for first generating address labels for transfer to the envelope. Other objects, advantages and features of the present invention will become better understood when a detailed description of a preferred embodiment of the invention is discussed in conjunction with the accompanying drawings.

DETAILED DESCRIPTION OF THE PREFERRED EMBODIMENT

Figure 1:
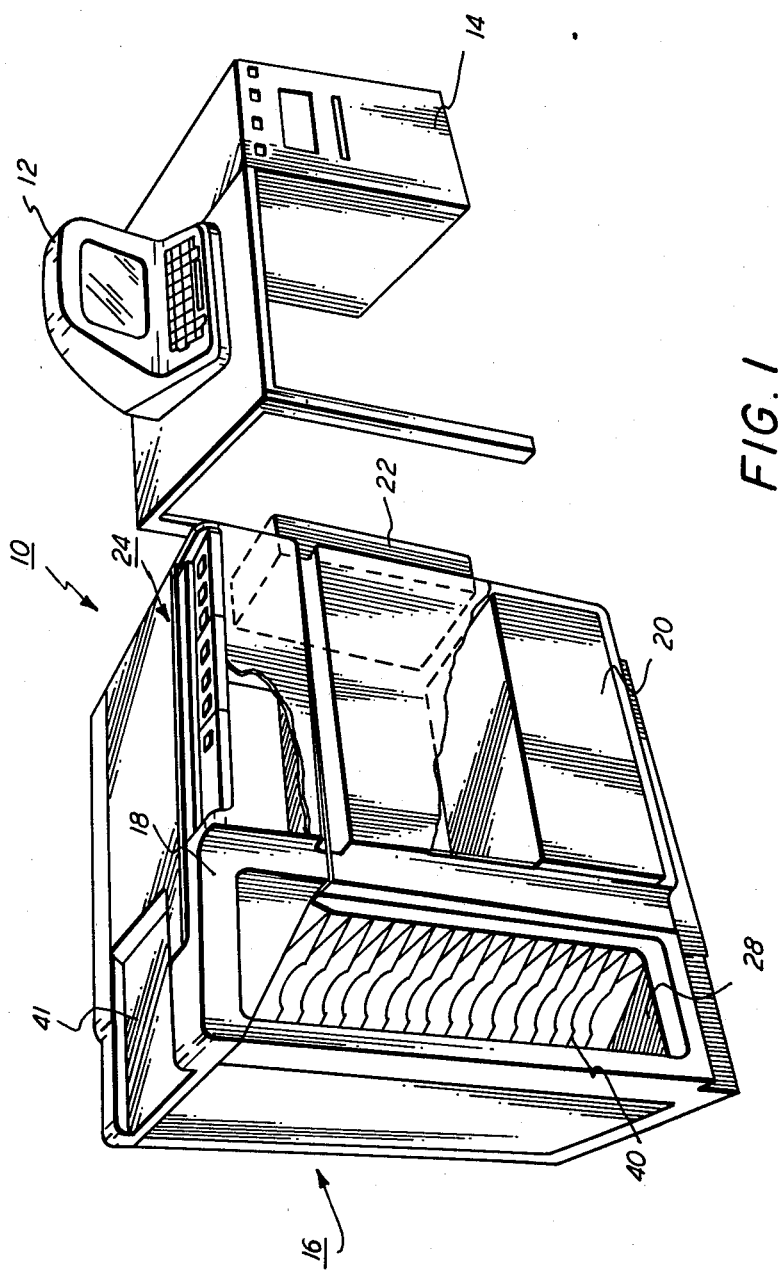
FIG. 1 is a perspective view of an information processing station which includes a xerographic marking engine.

Turning now to the drawings, there is shown in FIG. 1 an information processing station 10 comprising a terminal 12 positioned next to a module 14 having a disc storage unit and information processor coupled to a xerographic marking engine 16. The marking engine 16 is enclosed in a housing 18 to provide an attractive appearance to the processing station 10. Portions of the housing have been broken away to show the location of processing stations comprising the marking engine 16.

The marking engine 16 includes its own processor or controller 20 which can interact with the processor in the module 14 or can be operated in a "stand alone" mode to control operation of the marking engine. Also comprising the marking engine 16 are a paper supply unit 22, user interface 24, marking photoreceptor 26 (see FIG. 2) and an output station 28. The marking engine 16 can be used to generate a hard copy representation of informtion entered by a user through the terminal 12 or alternatively it can be used to generate hard copy of other information generated through some other source (such as magnetic tape) as dictated by the controller 20. The controller 20 can format the data according to user requirements or alternatively the format can be controlled by the user through the terminal 12. A Xerox Model 860 ® word processing station comprises the terminal 12 and module 14 and a modified (as described) Xerox Model 5700 ® marking engine comprises the marking engine 16.

Figure 2:
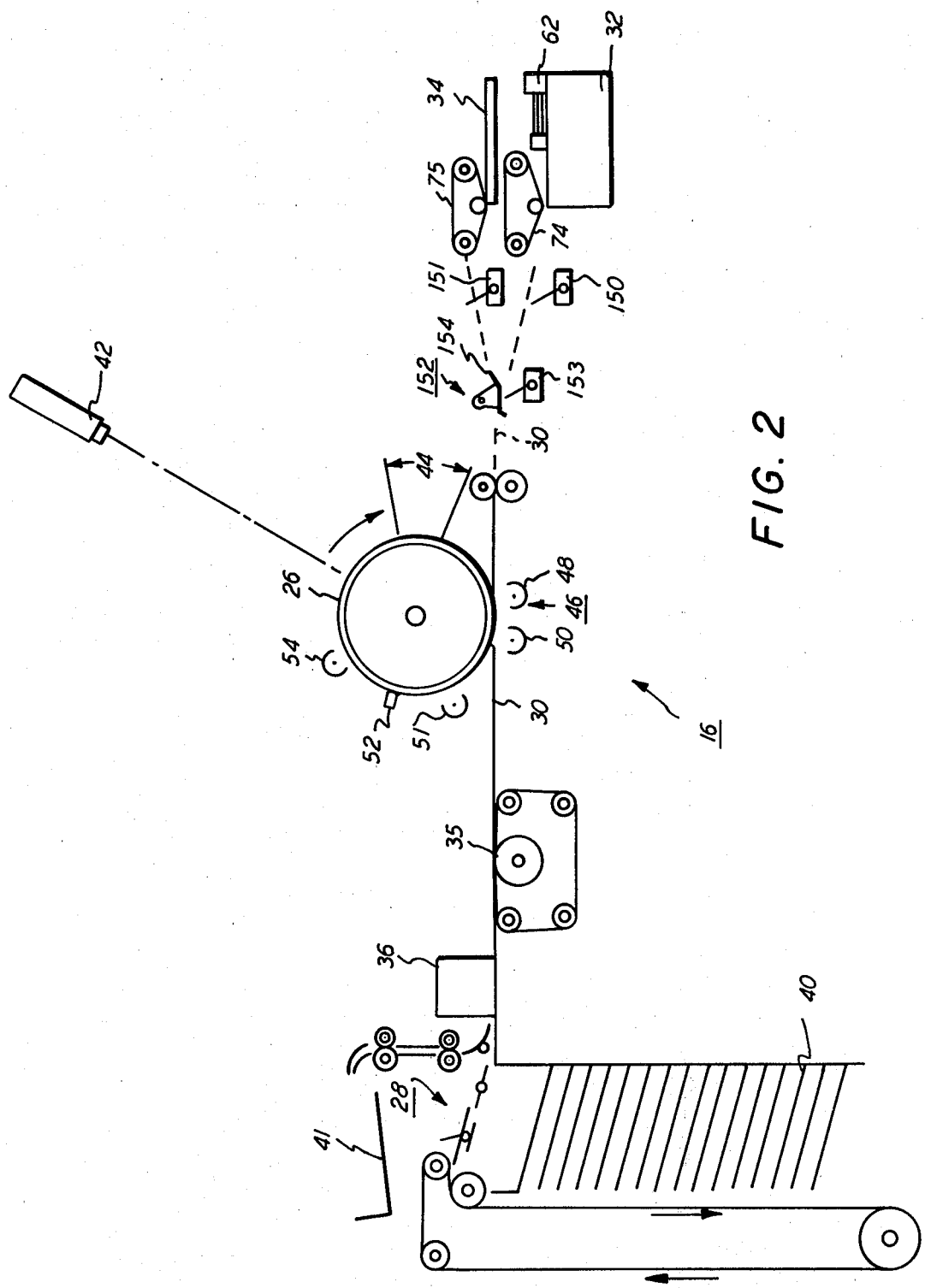
FIG. 2 is an elevation schematic view of the components of the marking engine.

As seen in FIG. 2 the marking engine 16 defines a paper path 30 from either a main 32 or auxiliary 34 paper tray or input to the marking photoreceptor 26. As the paper moves past the photoreceptor 26, a xerographic powder image is transferred from the photoreceptor to the paper. The image bearing paper is stripped from the photoreceptor and driven past a motion sensor 35 to a radiant fuser 36. The fuser element 36 renders the powder image substantially permanent and then the fused paper is transmitted to the output station 28 which as illustrated can comprise either a sorter 40 or an output tray 41 (FIG. 1).

Xerographic images formatted by the controller 20 are applied to the xerographic photoreceptor 26 in a conventional manner using a raster output scan (ROS) generated by a laser 42. A laser beam reflects off a rotating polygon mirror (not shown) exposes the photoreceptor to selectively discharge a charged photoconductive surface to create a latent image corresponding to a desired information pattern on the photoreceptor. The laser 42 is turned on and off under control of the controller 20 so that the desired information pattern appears on the photoreceptor. Subsequent to the creation of the latent image, the photoreceptor rotates in a clockwise direction through a development zone 44 where the latent image generated by the laser is rendered visible with a powder toner. The development step can be accomplished using a two component magnetic brush developer system. The photoreceptor and accompanying powder image then rotates to a transfer zone 46 where the powder image is transferred from the photoreceptor 26 to a copy sheet as it moves in image transfer relationship with respect to the photoreceptor. As is known in the art, the transfer of powder images from the photoreceptor to the copy sheet is facilitated by a transfer corotron 48 biased to a voltage to attract the charged toner particles from the photoreceptor to the copy sheet. Subsequent to image transfer, the photoreceptor rotates past a detack corotron 50 which facilitates in stripping the sheet from the photoreceptor 26. Those portions of the photoreceptor which are still charged are discharged by a discharge corotron 51 and then the photoreceptor is cleaned by a blade 52. The xerographic photoreceptor is again charged by a charge corotron 54 and subsequent xerographic latent images formed by the laser 42 and ROS system.

The disclosed marking engine 16 has been modified to provide an envelope printing capability unknown in the prior art. The envelope printing is performed in three separate applications. A first application is to print envelopes from a variable name and address list generated by one of the two controllers 14, 20. These envelopes are then combined with letters printed from the same name and address list to provide the user with the ability to perform the printing of variable text letters and envelopes from a common name and address list.

A second application consists of printing a supply of envelopes alone from a variable name and address list. This application exists in the situation when the letter to be mailed with the envelope is a non-personalized letter (i.e., a "Dear Sir" letter or a flyer) and hence does not require that the accompanying letters be generated from the variable name and address list.

A third application allows the customer to print a supply of envelopes. In this application, as in the previous two, the user is able to specify that certain items are to be printed on the envelope. The desired items can comprise the following: (1) return address, (2) company logo, (3) prepaid first class mailing stamp (this could also be internally treated as a logo), (4) a mailing address, (i.e., the address to which the letter is to be sent), and (5) an attention comment in the lower left hand corner of the envelope, which would bring the letter to the attention of some person or department at the main mailing address.

In the first two applications, the main mailing address, item (4) above, would come from the variable name and address list, while in the third application there might be circumstances when the customer would want to print a supply of envelopes all with the same mailing address. This application exists in the situation where a branch office, for example, sends a considerable amount of mail to a single mailing address at a home office location.

The remaining description defines how the marking engine 16 is notified of the requirement to print envelopes and how the printing is accomplished. With respect to the first issue, a sensor 60 (FIG. 5) mounted in the main paper tray 32 automatically detects the presence of an envelope cassette 62 in the tray (the envelope cassette 62 must be inserted into the main tray by the user). An alternate method of notifying the marking engine 16 of the desire to process envelopes would be to require the user to activate an input on the control panel 24. The disclosed system uses a combination of both alternatives. The user is presented with a simple choice early in the dialogue with the control panel 24 to allow him to indicate that envelope printing is desired. If the user chooses this feature, a message is flashed indicating that (A) the output tray 41 should be cleared to allow room for the envelopes to be output, (B) if so desired, paper should be loaded into the auxiliary input tray 34, and (C) the envelope cassette 62 should be loaded in the main tray. The marking engine 16 then awaits the insertion of the envelope cassette. At the conclusion of the job, a message is flashed to the operator to remove the envelope cassette, if it is no longer needed.

Figure 3:
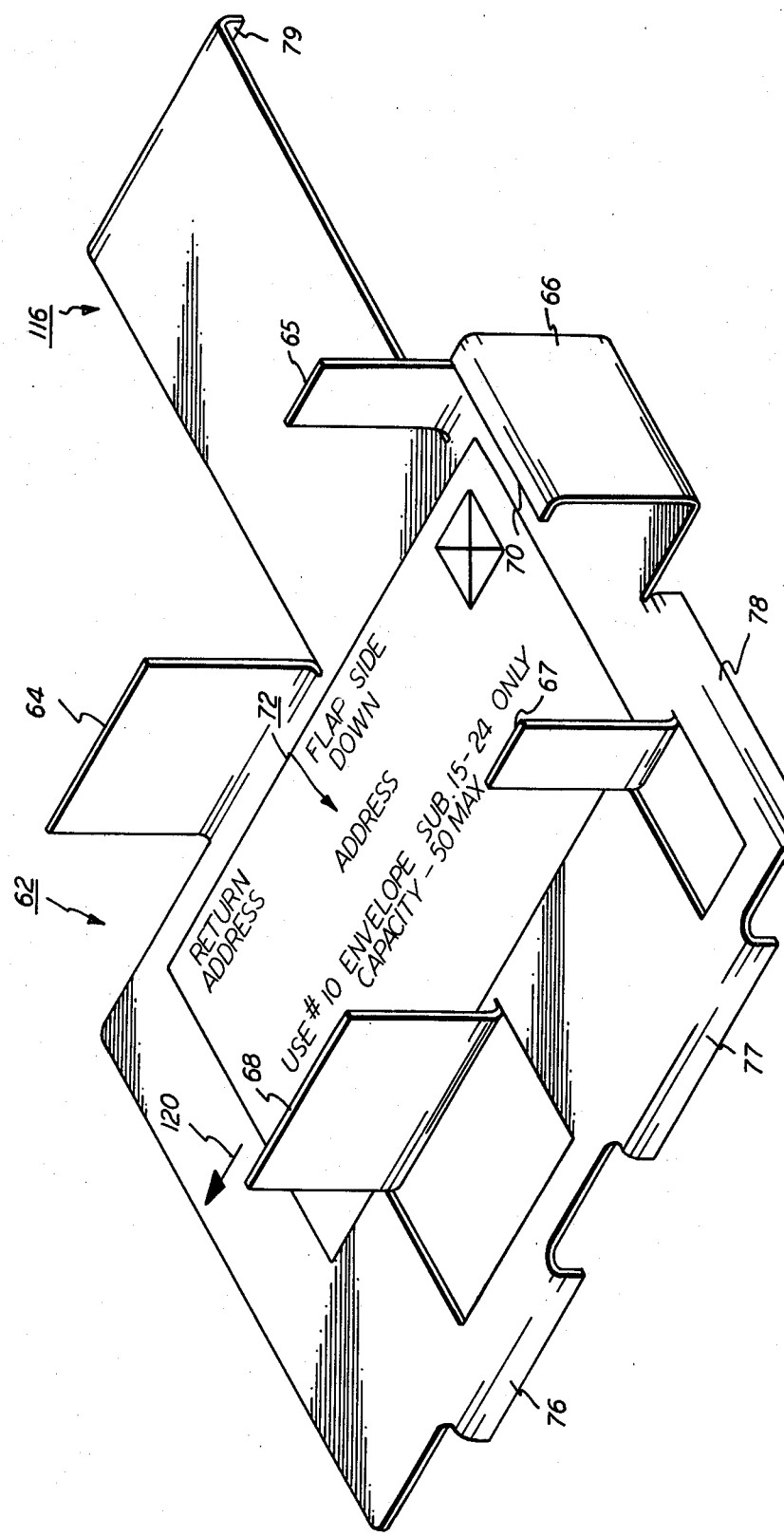
FIG. 3 is a perspective view of an envelope cassette for holding envelopes to be printed by the marking engine.

The specially designed envelope cassette 62 is depicted in FIG. 3. The cassette is a stamped and bent metal form including a first series of five tabs 64–68 which define the space into which envelopes are placed. The tab 66 has a right angle bend 70 a distance of 3.6 centimeters from the bottom surface 72 of the cassette which allows 50 number 10, 20-weight envelopes either $8\frac{1}{2}''\times11''$ or $8\frac{1}{2}''\times14''$ to be loaded flaps down into the cassette. Scribed into the bottom surface 72 of the cassette 62 are instructions in the form of schematic representation of an envelope on how the envelopes are to be oriented in the cassette.

The envelope cassette 62 is an accessory which must be insertable into the main paper tray 32 so that the envelopes are in proper alignment to be fed by the same sheet feeder 74 which feeds copy sheets during normal marking engine operation. Four additional tabs 76–79 help insure proper alignment of the envelopes in relation to the feeder 74, preclude improper installation of the cassette into the tray 32 as well as help activate the sensor 60 which initiates the envelope printing mode of marking engine operation.

Figure 5:
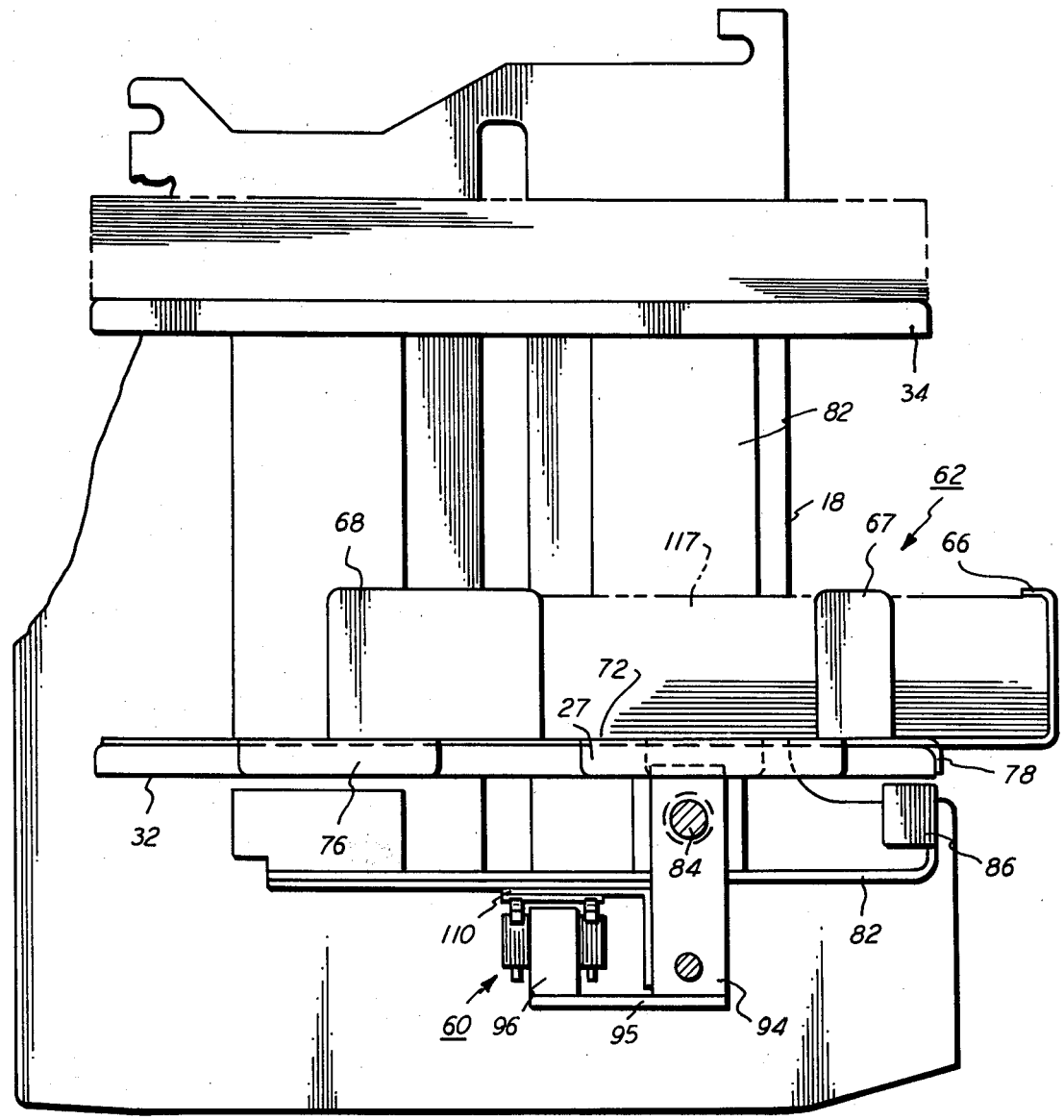
FIG. 5 is an elevation view of the cassette mounted in a main paper tray mounted beneath an auxiliary paper tray.
Figure 6:
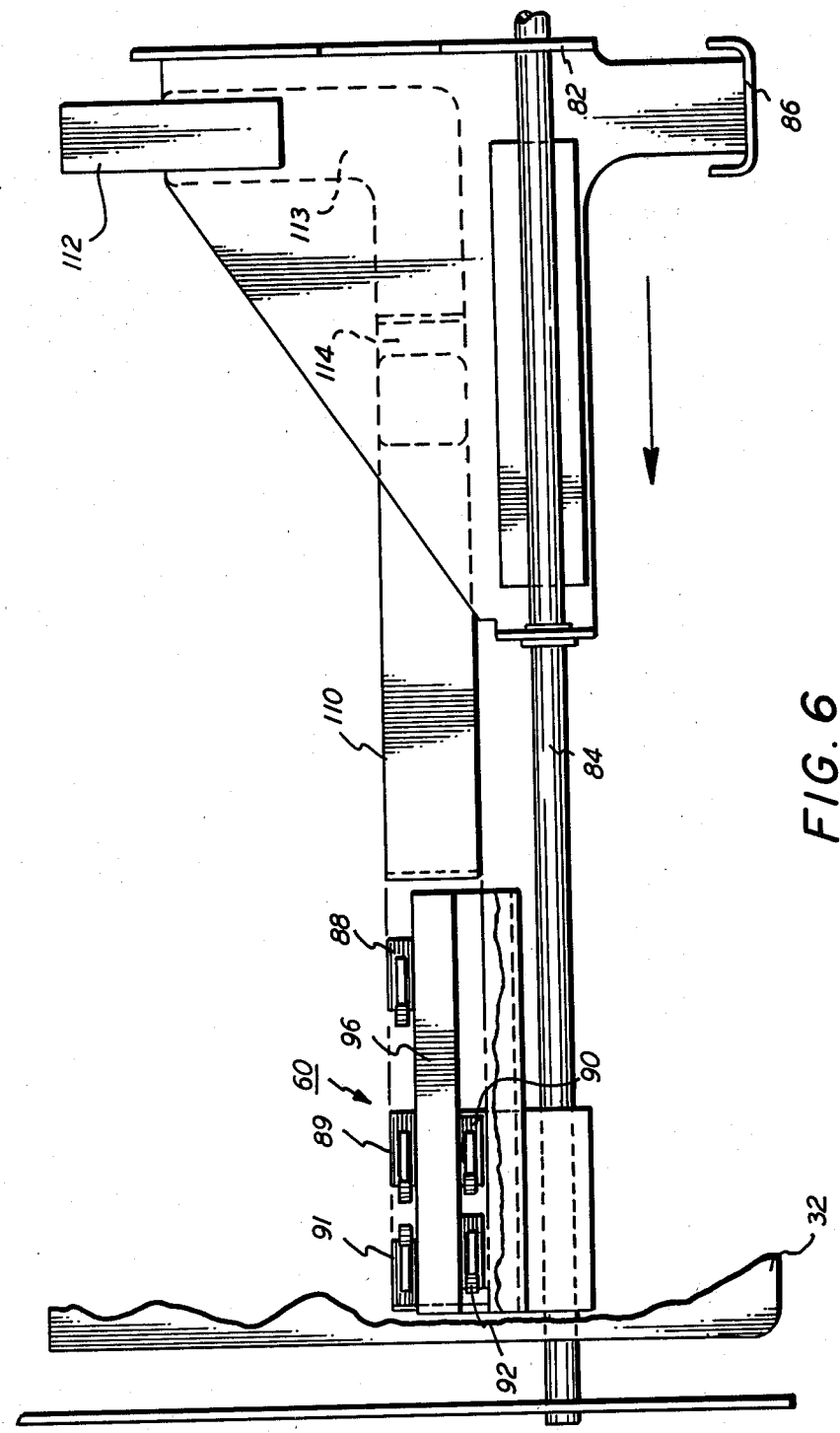
FIG. 6 is a plan view showing a series of switches mounted to the main tray which instruct a xerographic controller when the envelope cassette has been inserted into the main tray.

The cassette is shown mounted in the main tray 32 in FIG. 5. In the FIG. 6 plan view the main paper tray 32 has been broken away to show details of the cassette sensor 60 operation. During normal printing (i.e. non-envelope printing) the user inserts a stack of paper into the tray and adjusts the position of a paper guide 82 by sliding the guide 82 along a support rod 84 connected to the paper supply housing. The user accomplishes this adjustment by grasping a tab 86 connected to the guide and sliding the guide 82 until it abuts the stack of paper.

A series of five switches 88–92 connected to the support rod 84 through a series of mounting blocks 94–96 (FIG. 5) make up the operative components of the sensor 60. These five switches can be closed by a switch actuator 110 coupled to the paper guide 82 through an additional series of mounting blocks 112–114. Thus, as the guide 82 is moved toward the sensor 60 the actuator 110 closes the first switch 88 and then in turn the other switches 89–92. Depending on the size of the paper inserted into the tray 32 different combinations of switches are closed and the marking engine will accordingly be apprised of the paper size it is handling.

In the envelope handling mode of operation the cassette 62 is inserted into the tray 32, but to do so the guide 82 must be moved away from the switches a distance defined by an arm 116 (FIG. 3) which supports the tab 79. The length of the arm 116 is such that when the cassette 62 is in place in the tray 32 the actuator 110 closes none of the switches 88–92. This condition tells the controller 20 that the marking engine 16 is to be operated in an envelope printing mode.

In the preferred mode, to assure proper envelope feeding the envelopes 117 placed in the cassette 62 must be stock No. 15-No. 24 and the envelope material is a white woven sulphite base substance. Three commercially available examples of suitable envelopes are Campbell White Wove #10, Sub. 20, Universal White Wove #10, 20 lb., and Century White Wove #10, Sub. 20. Envelope feeding is from the main tray 32 only, and each envelope exits the cassette along the direction of the arrow 120 in FIG. 3.

The user formats the information to be printed just as he would format any other document on, for example, a magnetic storage tape. He can indicate special logos, return addresses, mailing addresses and special notices will be printed. The user can indicate both letters and envelopes are to be printed using a variable text file so that both are marked and interleaved in time with the envelopes fed from the main tray and the letters from the auxiliary tray.

The marking engine 16 will mark up to fifty envelopes (and fifty corresponding letters, if appropriate,) output them to the output tray 41 and prompt the user by the console 24 to clear the output tray 41. The letters corresponding to these envelopes are stacked in succeeding bins in the sorter 40. As many sets of letters as possible are placed in the first sorter bin with overflow sets of letters directed to subsequent sorter bins. The sorter bins contain only complete sets of letters to ease operator collation tasks. A maximum of fifty (50) sets of letters are stored in the sorter 40 before the system pauses for unloading. In the disclosed embodiment envelopes are stacked in the output tray but in an alternate embodiment letters and envelopes are interleaved in the sorter 40.

Separate top surface feeders 74,75 (FIG. 2) drive copy material from the main 32 and auxiliary 34 paper trays. As the copy material (sheets or envelopes) moves away from the paper trays two sensing switches 150,151 sense copy movement and co-ordinate the movement with the controller 20. The two paper paths merge at the site of a registration gate 152 which includes a separate sensing switch 153 to indicate to the controller the arrival of the copy material at the gate 152.

Figure 7:
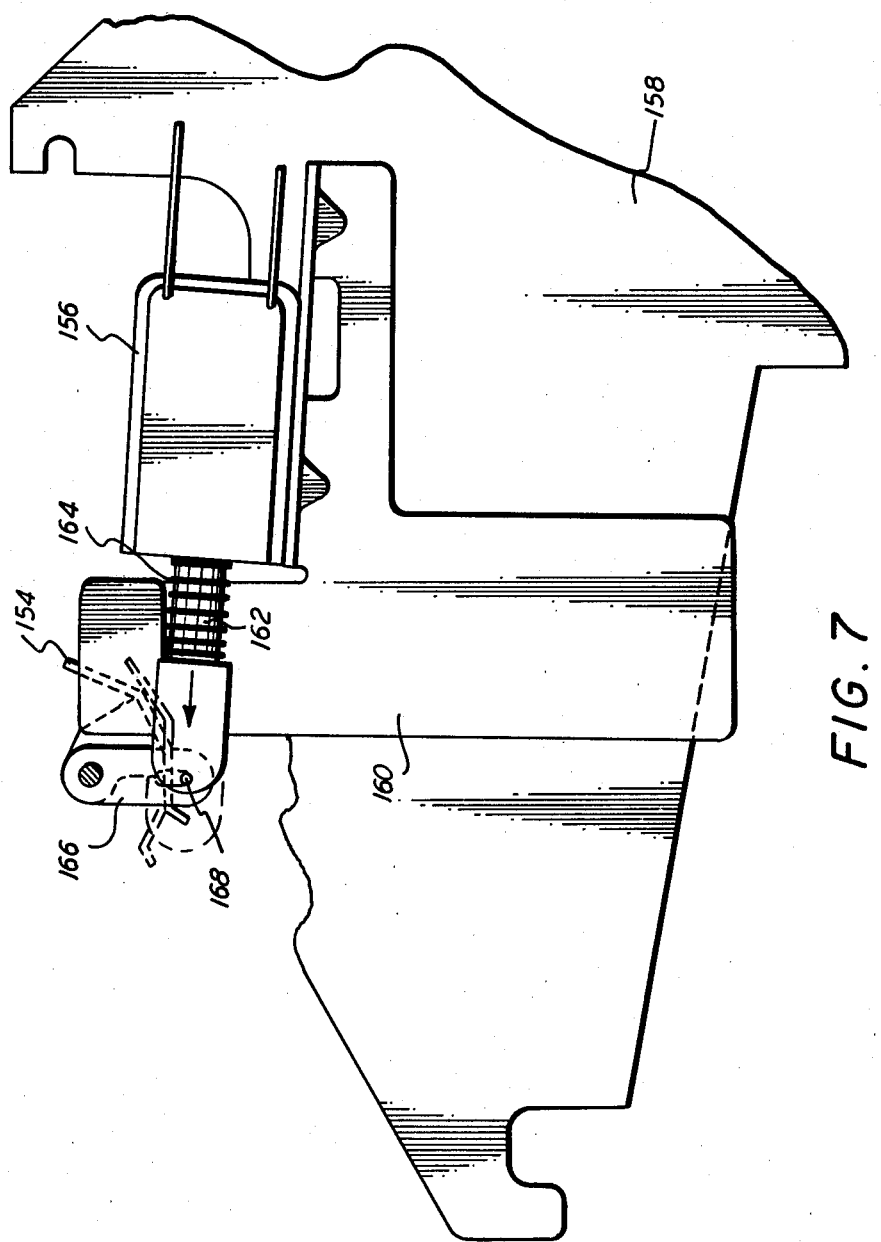
FIG. 7 is an elevation view of a solenoid actuated registration finger used in moving envelopes into transfer relation with a xerographic photoreceptor in the marking engine.
Figure 8:
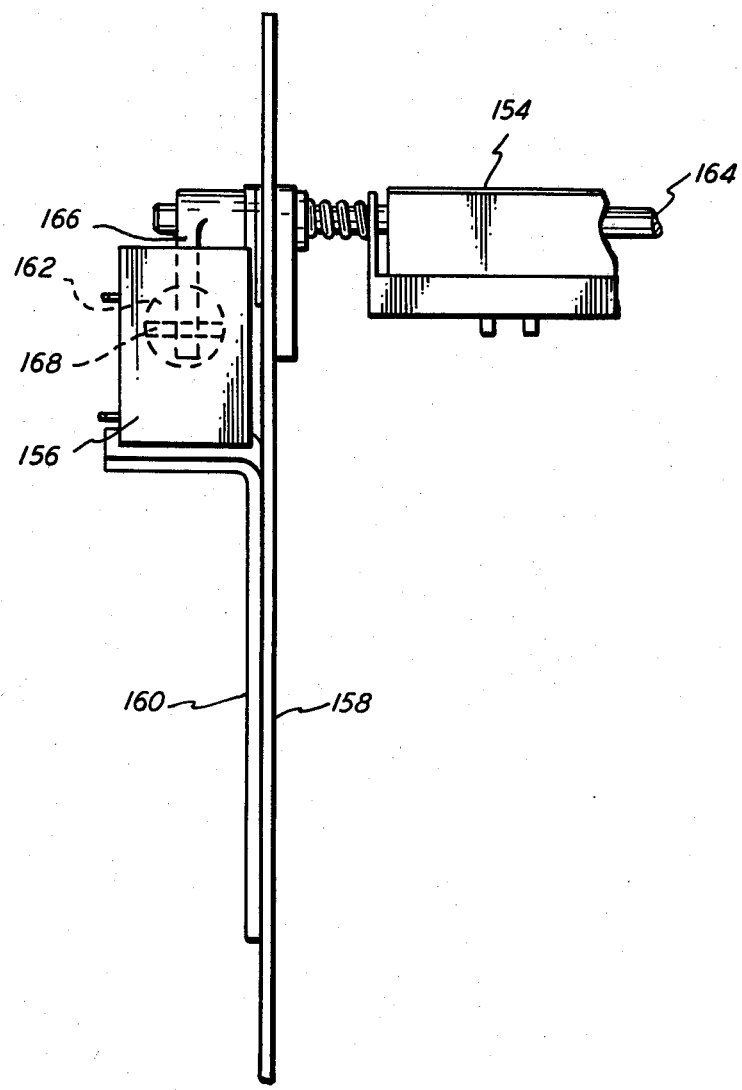
FIG. 8 shows an end view of the FIG. 7 registration finger.

Details regarding the gate can be seen by referring to FIGS. 7 and 8. The gate 152 includes a registration finger 154 which swings in and out of the path of copy material under control of a solenoid 156 mounted to a support member 158 via a mounting bracket 160. A solenoid plunger 162 is held in an extended position by a compression spring 164 when the gate 154 is open. When the solenoid is energized by the controller 20 the plunger 162 moves to the phantom position in FIG. 7 and rotates a shaft 164 by rotating an arm 166 connected to the shaft and coupled to the plunger 162 by a pin 168. In this energized position, the gate closes and causes the copy material to register with the photoreceptor for image transfer. By co-ordinating solenoid energization and de-energizing with rotation of the photoreceptor 26 and copy sheet movement, the copy sheet (either paper or envelope) arrives at the transfer station 46 in registration with the image on the photoreceptor 26.

In the envelope printing mode, the marking engine 16 must be modified slightly to insure xerographic images are properly transferred from the photoreceptor 26 to the envelope and then fused. Whereas when only copy sheets are being printed the marking engine 16 must transfer its xerographic images to a single ply piece of paper, in the envelope printing mode, the images must be transferred and fused on a double ply and in certain areas triple ply material. To accommodate this thicker copy material, the transfer current at the transfer corotron 48 is increased to a value of approximately 28 micro amps and the detack current at the detack corotron 50 is also increased to a value of about 17 micro amps. To accommodate the thicker material, the gap between the material and the radiant fuser 36 is increased by approximately 1/10". This increase in gap width between the fuser and the paper path reduces the effectiveness of fusing normal copy sheets only slightly while allowing the marking engine 16 to accommodate the thicker envelope material. Envelope printing also necessitates slight changes in the transport mechanism for moving the copy material from the copy input 22 to the output 28. The typical paper transport comprises a number of vacuum assisted drives wherein the transported paper is attracted to the paper path by sources of low pressure mounted to the printing engine 16. To attract the heavier weight envelopes, it is necessary that the vacuum assist be increased so that the force of attraction between transport and envelope can be increased to insure reliable envelope transport. When envelopes are alternated with letter sheets the envelope xerographic parameters are used. These parameters mark the envelopes without degrading image transfer and fusing of the normal copy (letter) sheets.

It should be appreciated that the envelopes 117 are 1" wider than normal 8½" paper. For this reason, certain areas on the envelope cannot be printed by the marking engine 16. When printing the wider envelopes, a ¼" margin or blank area must be maintained on the top, left hand, and bottom portion of the envelope. On the right hand portion of the envelope, a ¾" margin is maintained. For this reason, care must be taken when generating address information and/or logos to be printed on the envelopes that this information not be formatted to appear within these margin areas. Formatting within these constraints is an operator controllable function. In particular, the formatting of the envelope will typically be done by word processing software so that a format must be developed by the word processing operator to maintain the correct margins for envelope printing.

Figure 4:
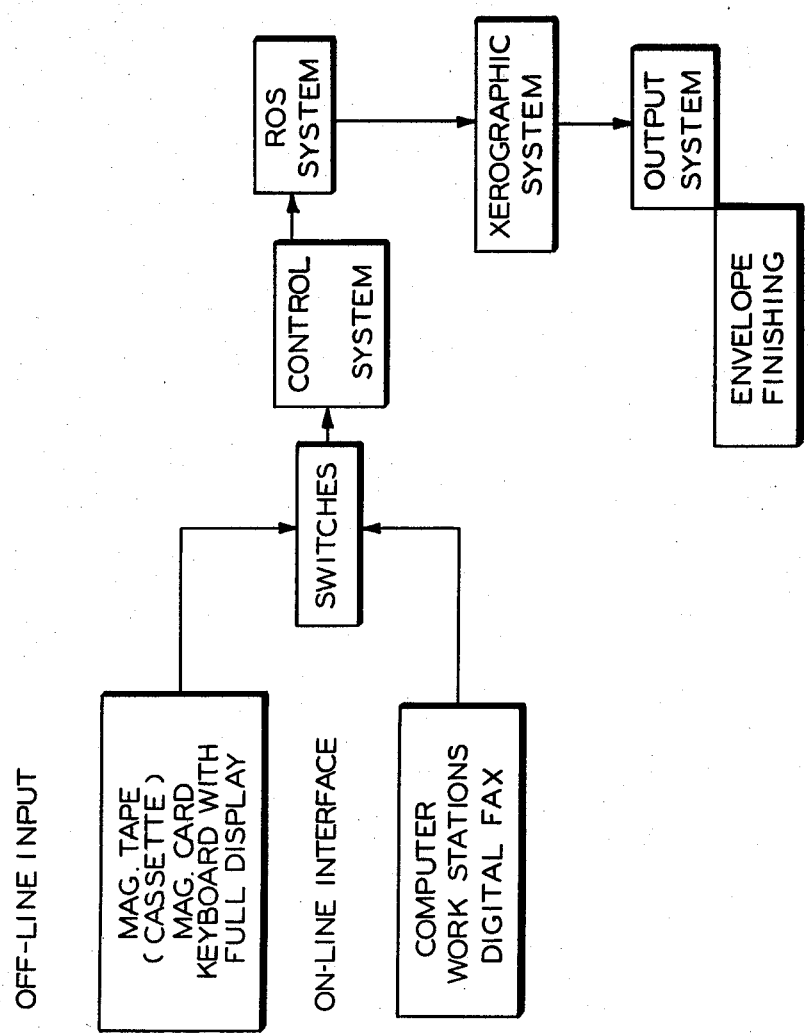
FIG. 4 is a flow chart showing the steps in processing envelopes as they are marked.

The envelope printing procedure is summarized in FIG. 4. The information to be printed is formed either on line from a computer work station or off line utilizing a mechanism for storing the information such as a magnetic tape. In either instance, the address information is input to the controller 20 system which also receives an input from the sensor 60 indicating the system is in a envelope printing mode. The control system as exemplified by the controller 20 then automatically controls the forming of images using the input data and the xerographic marking technique as modified in the envelope printing mode.

The present invention has been described with a degree of particularity. The xerographic marking engine utilized in combination with the invention could be modified and/or substituted with a different type of marking mechanism, for example, an ink jet printer. The performance criteria for the particular xerographic marking engine can also vary when other marking systems are substituted. It should also be appreciated that the mechanism for indicating to the controller 20 that the envelope printing mode has been initiated can be modified without departing from the spirit of the invention. For these reasons, it is the intent that all design modifications or alterations falling within the spirit or scope of the appended claims be protected by the present application.

I claim:

1. In a marking system, apparatus for processing envelopes by marking said envelopes with an address comprising:
    means for holding unmarked envelopes, said means for holding including means for distinguishing said envelopes from other materials to be printed by said system to cause said system to enter an envelope printing mode of marking;
    means for storing address information electronically and for converting said electronically stored information to signals for controlling the marking of said envelopes;
    means for moving said envelopes from said means for holding to a marking station where said envelopes are marked with address information;
    means for marking said envelopes with an address corresponding to the stored information; and
    means for stacking said envelopes encoded with the address information at an output station.

2. The marking apparatus of claim 1 wherein said means for marking comprises a xerographic copier having means for encoding and developing a charged photoconductive member with said information and further comprising means for bringing said unmarked envelopes into a transfer relationship with said developed photoconductive member.

3. The marking apparatus of claim 1 or 2 which further comprises means for holding sheets to be interleaved with envelopes at said output station after said sheets are marked by said means for printing and wherein said means for storing information also generates marking signals which encode the photoreceptor with information to be printed onto said sheets.

4. The marking apparatus of claim 2 wherein said copier comprises a main and auxiliary paper input tray and wherein said apparatus includes an envelope cassette insertable into said main paper tray to hold said envelopes prior to the xerographic marking of said envelopes.

5. Marking apparatus having means for processing envelopes by printing each of said envelopes with an address comprising:
    means for holding said envelopes in an unmarked condition;

means for sensing the presence of said envelopes in said means for holding to initiate an envelope printing mode of marking;

means for storing said address electronically and for converting said electronically stored address into control signals for printing said envelopes with said envelope addresses;

means for driving said unmarked envelopes to a print station for encoding with said address information; and means for collecting said printed envelopes subsequent to their being printed.

6. The apparatus of claim 5 wherein said marking apparatus comprises a xerographic copier and the print station comprises a region where developed xerographic images are transferred from a photoconductive member to the envelopes, said apparatus further comprising means for substantially permanently affixing said developed images to said envelopes.

7. Envelope marking apparatus comprising:
a xerographic marking engine including a photoconductive member and means for moving said member through charging, imaging development and transfer stations and further including transport means for moving a copy substrate into transfer relation with said photoconductive member at the transfer station to form a powder image on the substrate and fusing means for affixing substantially permanently said powder image to said substrate;

a paper tray for supporting individual copy sheets having a first uniform thickness prior to copying;

a cassette insertable into said paper tray for holding envelopes to be moved by said transport means to said transfer station for marking;

means responsive to the presence of the cassette into the paper tray to cause said marking engine to enter an envelope printing mode of operation, said envelope printing mode including the modification of the transfer, and fusing means to insure image transfer and affixing to portions of said envelopes which due to the multiple layers of said envelopes present a second, thicker substrate to said marking engine.

8. The marking apparatus of claim 7 wherein said transfer station comprises means for applying an image transfer current to said substrate and means for increasing said current when envelopes are to be printed.

9. A method for printing envelopes with a xerographic marking engine comprising the steps of:
inserting the envelopes in a holding tray;
sensing the presence of said envelopes in said tray;
modifying the xerographic marking parameters of said marking engine to print envelopes;
driving said envelopes, one at a time, from said holding tray to a xerographic transfer station for printing; and
stacking said printed envelopes in an output tray.

* * * * *